(12) United States Patent
Meehan et al.

(10) Patent No.: US 11,941,558 B2
(45) Date of Patent: Mar. 26, 2024

(54) INTELLIGENCE PREPARATION OF THE BATTLEFIELD (IPB) COLLABORATIVE TIME MACHINE WITH REAL-TIME OPTIONS

(71) Applicant: Raytheon Company, Waltham, MA (US)

(72) Inventors: Mark O. Meehan, Sterling, VA (US); David J. OConnor, Herndon, VA (US)

(73) Assignee: Raytheon Company, Tewksbury, MA (US)

( * ) Notice: Subject to any disclaimer, the term of this patent is extended or adjusted under 35 U.S.C. 154(b) by 147 days.

(21) Appl. No.: 17/225,540

(22) Filed: Apr. 8, 2021

(65) Prior Publication Data
US 2022/0327461 A1 Oct. 13, 2022

(51) Int. Cl.
| | |
|---|---|
| *G06Q 10/0631* | (2023.01) |
| *G06F 16/2455* | (2019.01) |
| *G06F 16/835* | (2019.01) |
| *G06Q 50/26* | (2012.01) |

(52) U.S. Cl.
CPC . *G06Q 10/063114* (2013.01); *G06F 16/2455* (2019.01); *G06F 16/835* (2019.01); *G06Q 10/0631* (2013.01); *G06Q 50/26* (2013.01)

(58) Field of Classification Search
CPC ....... G06Q 10/063114; G06Q 10/0631; G06Q 50/26
See application file for complete search history.

(56) References Cited

U.S. PATENT DOCUMENTS

| | | | |
|---|---|---|---|
| 9,116,975 B2 | 8/2015 | Shankar et al. | |
| 9,244,899 B1 | 1/2016 | Greenbaum | |
| 9,442,946 B1* | 9/2016 | Yuan | G06F 16/164 |
| 9,547,311 B2* | 1/2017 | Tamir | G06F 9/30 |
| 10,565,298 B1 | 2/2020 | Bisignani et al. | |
| 2001/0027389 A1* | 10/2001 | Beverina | G06Q 50/26 703/22 |
| 2003/0004693 A1* | 1/2003 | Neiman | G06T 19/00 703/1 |
| 2004/0007121 A1* | 1/2004 | Graves | F41G 3/04 705/400 |
| 2010/0015579 A1* | 1/2010 | Schlabach | G06N 5/04 434/11 |
| 2010/0066559 A1* | 3/2010 | Judelson | G08B 25/14 358/448 |

(Continued)

OTHER PUBLICATIONS

"Intelligence Preparation of the Battlefield," ATP 2-01.3, Headquarters, Department of the Army, Mar. 2019.*

(Continued)

*Primary Examiner* — Renae Feacher
(74) *Attorney, Agent, or Firm* — Schwegman Lundberg & Woessner, P.A.

(57) ABSTRACT

Discussed herein are devices, systems, and methods for dynamic IPB product updates or generation. A method can include storing, by a memory device, information used to generate IPB products, receiving, by a server coupled to the memory device, a request for an IPB product of the IPB products, receiving, by the server and from the memory device, information that satisfies conditions of a query, generating the requested IPB product based on the received information, and providing the requested IPB product to a client device.

20 Claims, 6 Drawing Sheets

(56) References Cited

U.S. PATENT DOCUMENTS

| | | | | |
|---|---|---|---|---|
| 2012/0231887 A1* | 9/2012 | Lee | ............... | A63F 13/79 |
| | | | | 463/39 |
| 2016/0204934 A1* | 7/2016 | Smith | ............... | H04L 63/20 |
| | | | | 726/4 |
| 2020/0134491 A1* | 4/2020 | Cruise | ............... | G06N 20/00 |

OTHER PUBLICATIONS

Lavika Goel, Daya Gupta, V.K. Panchal, Two-phase anticipatory system design based on extended species abundance model of biogeography for intelligent battlefield preparation, Knowledge-Based Systems, vol. 89, 2015, <https://doi.org/10.1016/j.knosys.2015.07.023 .>.*

Roux, JN and van Vuuren, JH, "Threat evaluation and weapon assignment decision support: A review of the state of the art," NR Volumn 23(2) pp. 151-187.*

* cited by examiner

INTELLIGENCE PREPARATION OF THE BATTLEFIELD (IPB) COLLABORATIVE TIME MACHINE WITH REAL-TIME OPTIONS

TECHNICAL FIELD

Embodiments discussed herein regard devices, systems, and methods for intelligent preparation of the battlefield (IPB). The IPB techniques taught herein provide for IPB states that can be updated and exported, are collaborative, can be compared across IPB products, among other advantages.

BACKGROUND

IPB is a standard process in the military. IPB presents a view of a systematic evaluation of effects of characteristics of an operational environment (OE) on an operation for one or more specific missions. IPB products provide situational understanding that can assist commanders and staff alike. IPB can help identify relevant aspects within an area of operations or area of interest that can affect accomplishing a mission.

DETAILED DESCRIPTION

Figure 1:
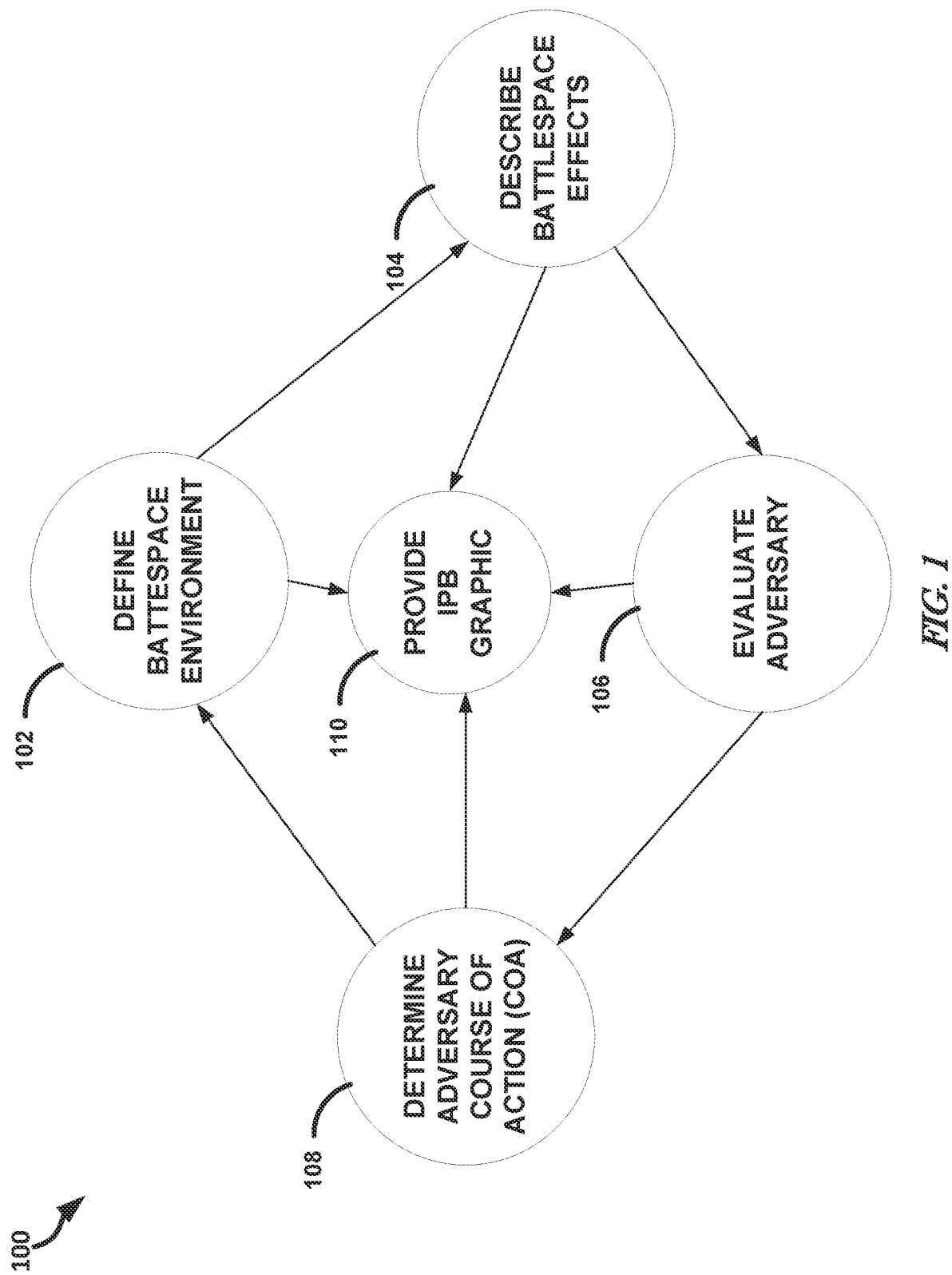
FIG. 1 illustrates, by way of example, a diagram of a technique for IPB.

Intelligence preparation of the battlefield (IPB) is a systematic process of analyzing the mission variables of enemy, terrain, weather, and civil considerations in an area of interest to determine their effect on operations. IPB allows military personnel to approach analyzing the operational environment (OE). An output of IPB can describe the totality of relevant aspects of the OE that may impact friendly, threat, and neutral forces, account for relevant domains that may impact friendly and threat operations, identify windows of opportunity to leverage friendly capabilities against threat forces, and allow commanders to leverage positions of relative advantage at a time and place most advantageous for mission success with the information available.

IPB results in intelligence products that are used during the military decision-making process (MDMP) to assist in developing friendly courses of action (COAs) and decision points for the commander. Additionally, the conclusions reached and the products developed during IPB can be important to planning information collection and targeting operations. IPB products include threat situation templates with associated COA statements and high-value target (HVT) lists, event templates and associated event matrices, modified combined obstacle overlays (MCOOs), terrain effects matrices, and terrain assessments, weather effects work aids, such as weather forecast charts, weather effects matrices, light and illumination tables, and weather estimates, and civil considerations overlays and assessments.

In IPB operations, however, the output of the IPB process is typically the only information stored and operated on. The output is typically an image with layers that illustrates the effects of the OE on the environment among other things. Aspects of this disclosure herein store data regarding one or more steps of the IPB process, layers generated in the IPB process, data used in generating one or more of the layers, a combination thereof, or the like. The stored data provides for improved IPB products, integrity checking or verification, or the like.

Typical IPB products are exported to documents and are not kept live or dynamic. The information used to generate the IPB products are typically not versioned or stored as being associated with an IPB product. Using the typical IPB products and systems, there is no built-in collaboration on the creation and updates of IPB products, and some IPB products can become stale as soon as they are created. Typical IPB solutions also do not allow for both live and historic views of information related to IPB products for situation report (SITREP). Further, IPB comparisons and merges are not currently implemented by other solutions as they do not store the underlying data associated with the IPB products. More complex multi-step IPB products take time and in some cases need multiple perspectives (people) to complete before presentation exports to users.

Aspects of this disclosure provide a process of IPB live interaction from creation to updates, live views to historic snapshots, live and historic IPB comparisons, IPB report exports and additional actions that result from generating and maintaining a live IPB repository. Aspects of this disclosure provide for the use of a live collaborative IPB framework that enables the creation of historic IPB snapshots as well as live IPB views across authorized users while providing create, read, updated, and delete (CRUD) operations, IPB merge, IPB comparison and IPB report export to facilitate better and more timely SITREPs.

In general, the current IPB process general ends with the creation of a static date-stamped document. Aspects of this disclosure provide IPB processes that store updatable IPB states that can be exported at any point. The current IPB process is not collaborative. Users may share documents once created but the data used to generate the IPB product is static. Aspects of this disclosure provide an IPB process is collaborative. The current IPB process does not allow for point in time IPB comparisons within an application. Aspects of this disclosure provide an IPB process that can compare any 2 selected IPB products.

An IPB process of aspects of this disclosure can be used to store IPB product state at a point in time snapshot to include entity data, spatial data layers, imagery data layers, data link graph layout and depth information, user entered meta-data, and IPB step dependencies. Aspects of this disclosure allow an authorized user to form a historic view or a live view of an IPB product that provides data updated to reflect a current state of data while maintaining settings and filters.

Viewing IPB products across user and allowing for collaboration and comparisons with the ability to export dynamic IPB reports to many formats is unique. This process stores live data snapshots across spatial data, graph data, imagery data, user entered meta-data, annotations, IPB stages, are stored in an accessible data fabric that can be searched and filtered. This process also allows for semi-automated IPB comparisons and merging. Going live with a view of an IPB and respecting historic IPB settings is unique to the aspects of this disclosure.

Reference will now be made to the FIGS. to describe details of the aspects of this disclosure.

FIG. 1 illustrates, by way of example, a diagram of a technique 100 for IPB. The technique 100 as illustrated includes defining a battlespace environment, at operation 102, describing battlespace effects, at operation 104; evaluating an adversary, at operation 106; determining adversary course of action (COA), at operation 108; and displaying an IPB graphic, at operation 110.

The operation 102 can include identifying geographical limits of an operational area. The operational area is a predicted geographical region over which adversarial engagement will occur. The operation 102 can include analyzing the mission. The operation 102 can include determining significant characteristics of the operational area. Significant characteristics can include geographic points of interest whether manmade or natural (e.g., a mountain, valley, bridge, road, building, mountain pass, cliff face, river or other waterway, or the like). The operation 102 can include establishing limits of intelligence for each battlespace dimension. The operation 102 can include identifying an amount of detail that is feasible within the time that is available for analysis. The operation 102 can include evaluating existing intelligence data. The operation 102 can include identifying gaps in intelligence and priorities for filling those gaps. The operation 102 can include collecting the intelligence for the IPB graphic production (at operation 110).

The operation 104 can include analyzing the military aspects affected by the geography and weather of the battlespace (from operation 102). The operation 104 can include evaluating the effects of each battlespace dimension on military operations. The operation 104 can include describing the battlespace's effects on adversary and friendly operations and COAs.

The operation 106 can include identifying adversary centers of operations. The operation 106 can include creating an adversary model. The adversary model can account for adversary assets, intelligence, and intent. The operation 106 can include determining, using the model, the current adversary situation. The operation 106 can include identifying adversary capabilities (e.g., weapons, transport, communications, personnel, a combination thereof or the like).

The operation 108 can include identifying the adversary's likely objective(s) and desired result. The operation 108 can include identifying COAs available to the adversary. The operation 108 can include evaluating and ranking each COA. The operation 108 can include developing the COA in the amount of detail time allows. The operation 108 can include identifying requirements for an initial action.

The operation 110 can include displaying one or more images. The images can be superimposed on each other, such as to provide personnel an ability to intelligently prepare the battlefield. The images can be different layers that provide different information to the personnel. The different layers can include a first layer for the operation 102, a second layer for the operation 104, a third layer for the operation 106, and a fourth layer for the operation 108. The first layer can provide a view of the area of operation. The extent (e.g., boundary) of the area of operation can be defined by personnel. The first layer can provide a view of areas of operations for adjacent military units. The first layer can indicate a hierarchy (or subordination chain) of units in the areas of operations.

The second layer can include a view of a modified combined obstacle overlay. The second layer can portray military aspects of the operational environment and the geographical aspects of the operational environment. The second layer can provide a graphical depiction of avenues of operation, mobility corridors, natural and manmade obstacles, terrain mobility classifications, key terrain, a combination thereof, or the like.

The third layer can provide a view of current physical locations of potential threats in the area of operations. The third layer can provide personnel with a view of the current location of known adversary assets.

The fourth layer can provide a view of an overall situation in the area of operations. The fourth layer can be determined based on the data gathered at operation 108. The fourth layer can include a view of movement of adversarial assets, time phase lines, graphic control measures, areas of interest, task, purpose, method, end state, range fans of weapons, avenues of approach, a combination thereof, or the like.

The operation 110 can include providing a view of a threat model, threat template, event template, an event matrix, or a combination thereof. The threat model can convert the threat to a graphic depiction of the threat. The threat model can describe the threat's known tactics, options, and peculiarities. The threat model can provide a depiction of high-value targets, enemy dispositions, compositions, and strengths.

The threat template can include distance or time between threat forces conducting an operation or activity. The threat template can include graphic control measures.

The event template provides a guide for collection planning. The event template can include time phase lines, maned areas of interest, threat decision points, indicators of threat activity, a combination thereof, or the like.

The event matrix associates a named area of interest and threat decision point with an indicator to determine which COA the personnel will implement.

In a typical IPB scenario, the graphic provided from operation 110 is provided and none of the data used to generate the graphic in operation 110 is stored or associated with the graphic. This lack of data retention is costly in terms of generating a next graphic, comparing results of graphics, comparing graphics, or the like.

Figure 2:
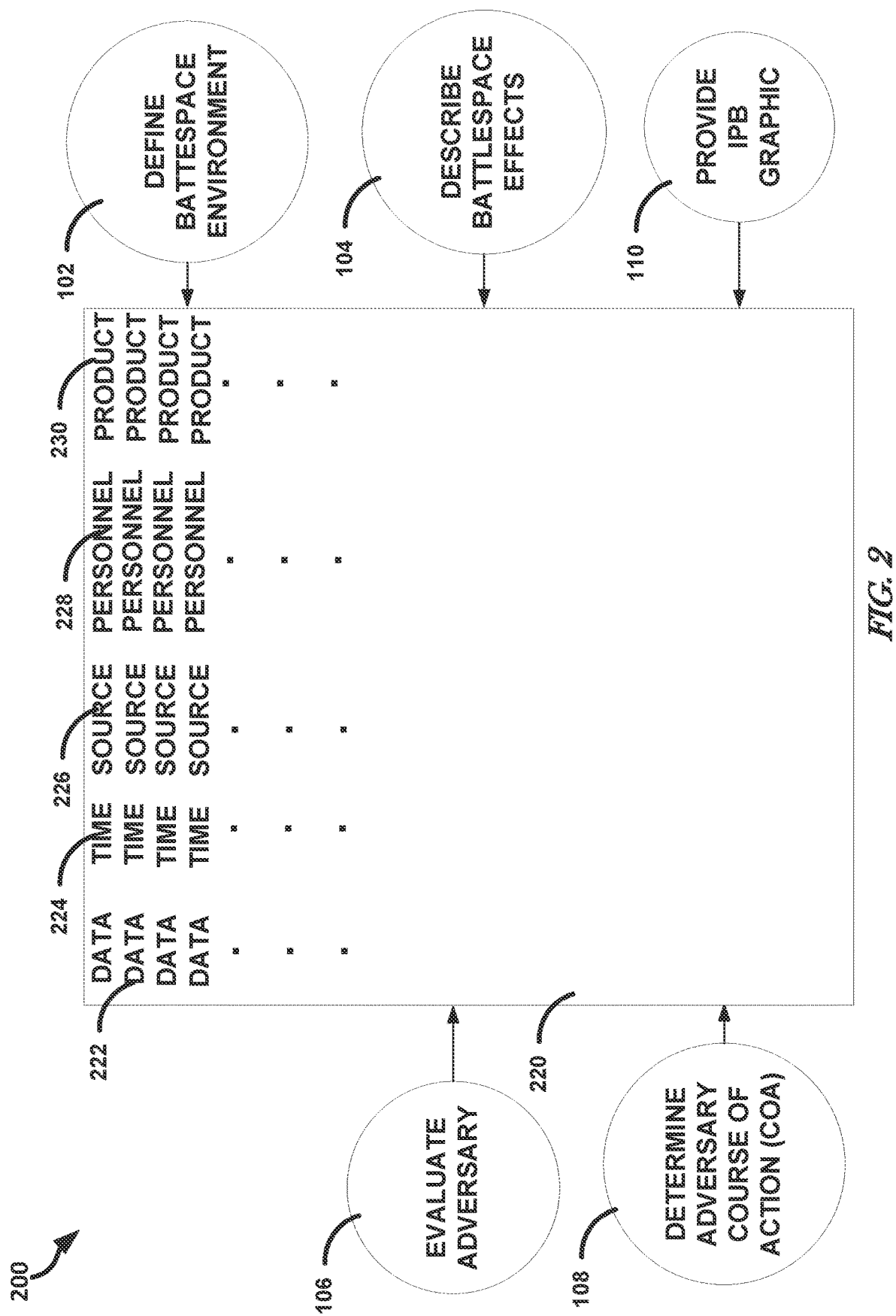
FIG. 2 illustrates, by way of example, a diagram of a system for improved IPB.

FIG. 2 illustrates, by way of example, a diagram of a system 200 for improved IPB. The system 200 as illustrated includes a memory device 220 that receives information related to the technique 100. The memory device 220 stores information input into the operations 102, 104, 106, 108, 110 and output from the operations 102, 104, 106, 108, 110.

The information stored in the memory device 220 can include data 222, time 224, source 226, personnel 228, product 230, a combination thereof, or the like. The data 222 can include the actual value of the data input or output from a corresponding operation 102, 104, 106, 108, 110. The time 224 indicates a time the product 230 was generated. The source 226 indicates the personnel or device (e.g., intelligence, surveillance, and reconnaissance (ISR) device) that provided the data 222. The personnel 228 indicates the personnel that ordered the produce 230. The product 230 indicates the type of graphic that is output from the operation 110.

The information can be stored in the memory device 220 as structured or semi-structured information. Example data formats include extensible markup language (XML), yet another markup language (YAML), hypertext markup language (HTML), JavaScript object notation (JSON), tom's obvious, minimal language (TOML), coffeescript object notation (CSON), among others. The structured or semi-structured nature of the stored information can provide for ease of query, search, fetch, compare, or other operation on the information.

Figure 3:
FIG. 3 illustrates, by way of example, a diagram of a system for IPB.

FIG. 3 illustrates, by way of example, a diagram of a system 300 for IPB. The system 300 as illustrated includes client devices 330A, 330B, 330C coupled to a server 350. The client device 330A-330C can issue a request to the server 350 for an IPB product or issue a report to the server 350. The report can indicate additional or alternative data relevant to a battlespace. The client devices 330A-330C can be operated by personnel concerned with the same battlespace.

The information in the memory device 220 can be accessed by the server 350, such as to perform an operation 336, 338, 340, 342, 344, 346, 348. The result of the operation 336, 338, 340, 342, 344, 346, 348 can be provided to one or more client devices 330A-330C.

Each of the client devices 330A-330C includes processing circuitry 332A, 332B, 332C that can issue a request to the server 350 or receive a result from the server 350. The processing circuitry 332A-332C can convert the results from the server 350 into a format compatible with the display 334A-334C. The processing circuitry 332A-332C can include electrical or electronic components configured to perform operations of the client device 330A-330C. The electric or electronic components can include one or more resistors, transistors, capacitors, inductors, diodes, logic gates (e.g., AND, OR, XOR, negate, buffer, or the like), processing units (e.g., central processing units (CPUs), application specific integrated circuits (ASICs), field programmable gate arrays (FPGAs), graphics processing units (GPUs), or the like), oscillators, multiplexers, switches, amplifiers, power supplies, a combination thereof, or the like.

The display 334A-334C can include any device capable of providing a visual depiction of the results from the server 350. The display 334A-334C can include a liquid crystal display (LCD), light emitting diode (LED) display, plasma display, projector and screen, touch screen, or the like.

The server 350 can include processing circuitry configured to implement the operations 336, 338, 340, 342, 344, 346, 348. The server 350 can receive a request from a client device 330A-330C, enforce an access policy using operation 340, and implement the request if the client device 330A-330C passes based on the access policy. In implementing the request, the server 350 can perform one or more of the operations 336, 338, 340, 342, 344, 346, 348.

The operation 336 can include issuing a query to the memory device 220. The operation 336 can include providing the client device 330A-330C with results of the issued query.

The operation 338 can include creating, reading, updating, and deleting (CRUD) information stored in the memory device 220. The CRUD operation 338 can be logged in the memory device 220 so that a future user can audit, reverse, or otherwise understand the history of the information.

The operation 340 can compare credentials of a user of the client device 330A-330C to a permissions policy. The permissions policy can indicate who has permissions to read, write, create, alter, augment, or otherwise perform an operation on information in the memory device 220. Different information can have different permissions. For example, a user can have permissions to alter and view first information of the memory device 220 but may not have permissions to alter or view second, different information of the memory device 220.

The operation 342 can include a series of instructions provided to a user of the client device 330A-330C in generating a report. The report generated at operation 342 can be propagated to any future IPB products generated by the server 350 or to an IPB product that is being provided using live view operation 348.

The operation 344 can include querying the memory device 220 for two or more IPB products. The operation 344 can include comparing the information retrieved from the memory device 220 to determine differences between IPB products. The operation 344 can include tagging, marking, or otherwise indicating what data is different between the IPB products that were subject of the query.

The operation 346 can include providing a view of different images overlaid (one on the other), asking a user to choose between different form data, or the like. The operation 346 can include storing the merged data as associated with a same product. A time associated with the merged data can be set to a time the query was issued, the request from the client device 330A-330C was received, a time the merged data was saved, or the like.

The operation 348 can include pushing updates to products provided to the client device 330A-330C. The push update can be provided in response to receiving a report (through operation 342) from one of the client devices 330A-330C. The server 350 can determine if the report regards a geographical area that is the subject of a product for which a live view is being provided by operation 348. If so, the server 350 can perform operations 344 and 346 on the data from the report and the information associated with the display of the live view from operation 348. The updated version of the product can then be provided using operation 348. The updated version of the product can include a graphical indication of what is different in the updated version of the product.

Figure 4:
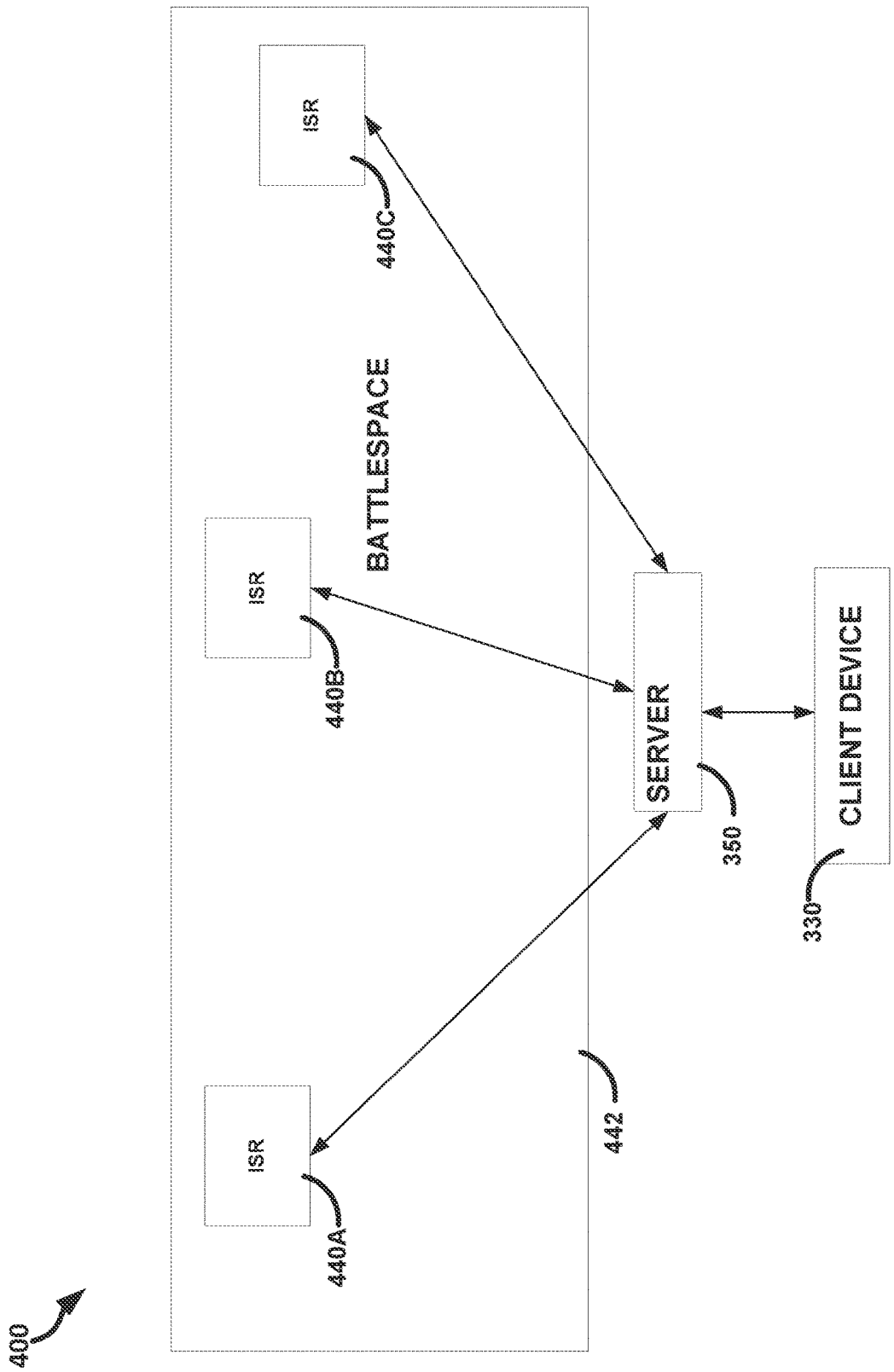
FIG. 4 illustrates, by way of example, a diagram of a system for gathering of some IPB information.

FIG. 4 illustrates, by way of example, a diagram of a system 400 for gathering of some IPB information. The system 400 as illustrated includes a battlespace 442 that is monitored by intelligence, surveillance, and reconnaissance (ISR) entities 440A, 440B, 440C. The ISR entities 440A-440C can collect information regarding the battlespace 442. The information can be collected through systematic observation by deployed soldiers or a variety of electronic sensors. Information gained by the ISR entities 440A-440C can be provided to intelligence personnel (the client device 330) through the server 350. The ISR information can contribute to an understanding of the relevant happenings on the battlespace 442, and of enemy dispositions and intents. The information can be provided to the server 350. The server 350 can update data of any IPB products regarding the battlespace 442 based on the provided information. The server 350 can update a view of any IPB products that are currently being viewed live, such as in response to receiving information relevant to the battlespace 442.

Figure 5:
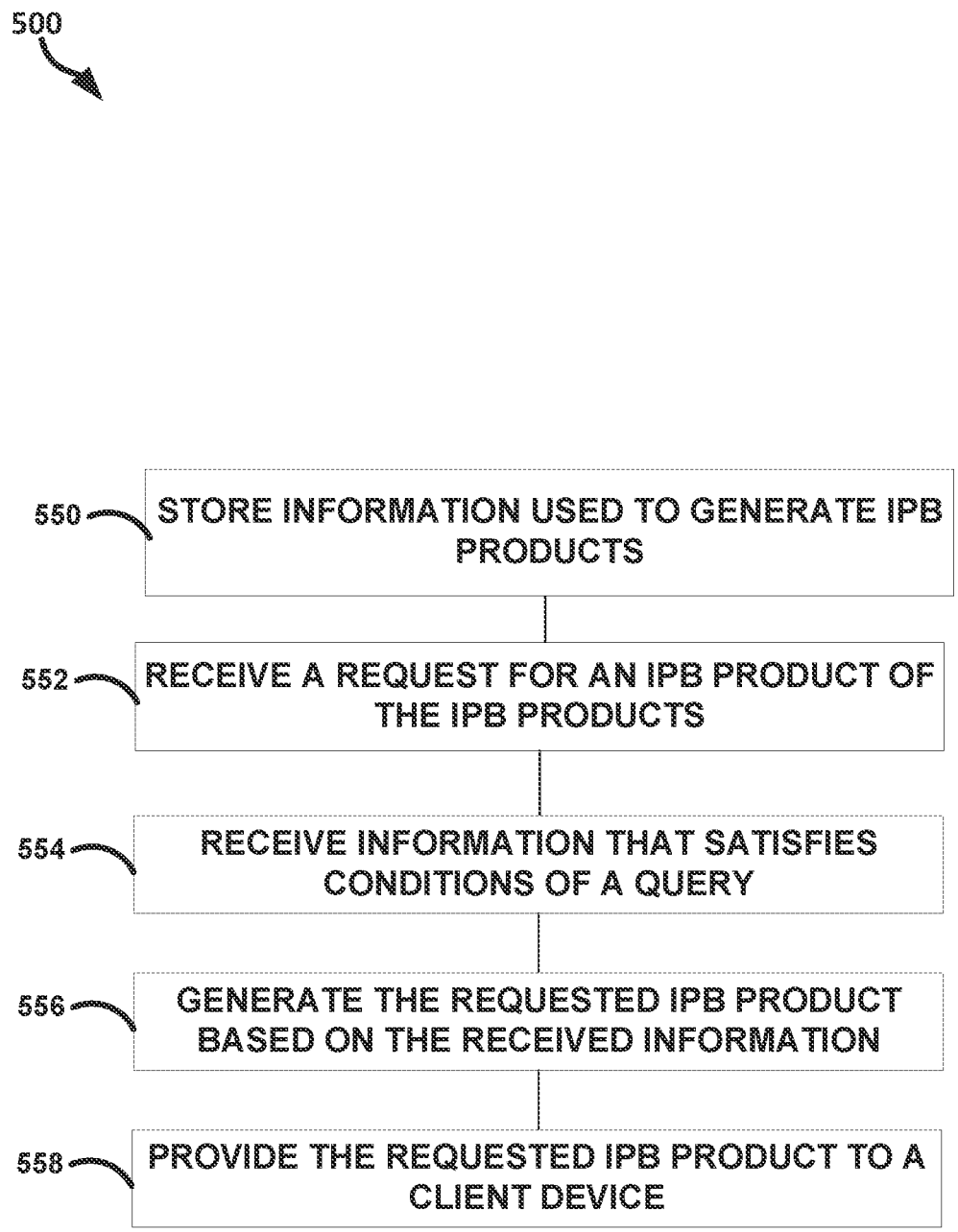
FIG. 5 illustrates, by way of example, a diagram of a method for dynamic IPB product management.

FIG. 5 illustrates, by way of example, a diagram of a method 500 for. The method 500 as illustrated includes storing, by a memory device, information used to generate IPB products, at operation 550; receiving, by a server coupled to the memory device, a request for an IPB product of the IPB products, at operation 552; receiving, by the server and from the memory device, information that satisfies conditions of a query, at operation 554; generating the requested IPB product based on the received information, at operation 556; and providing the requested IPB product to a client device, at operation 558. The query can be configured to, when executed, satisfy the request. The request can be reformatted into the query, such as to include conditions of the request with or without additional conditions.

The information stored at operation 550 can be stored in a structured or semi-structured format. The method 500 can further include, wherein each item of the information is associated with an IPB product identification (ID), a timestamp indicating when the IPB product was generated, and a personnel ID indicating an entity that generated a report that includes the information. The method 500 can further include, wherein the request specifies an IPB product identification (ID) or a battlespace extent and the query includes the IPB ID or battlespace extent.

The method 500 can further include, wherein the information used to generate the IPB products includes information gathered and provided in performing each of a plurality of operations comprising one or more of: defining a battlespace environment, describing battlespace effects, evaluating an adversary, or determining a course of action of the adversary. The method 500 can further include comparing the received information with information for another IPB product to identify differences between the IPB products (and providing a graphical view of the identified differences)

The method 500 can further include receiving a second report, from a second client device, regarding a battlespace associated with the generated IPB product. The method 500 can further include updating the received information in accord with the second report. The method 500 can further include generating an updated IPB product and providing the updated IPB product to the client device.

Figure 6:
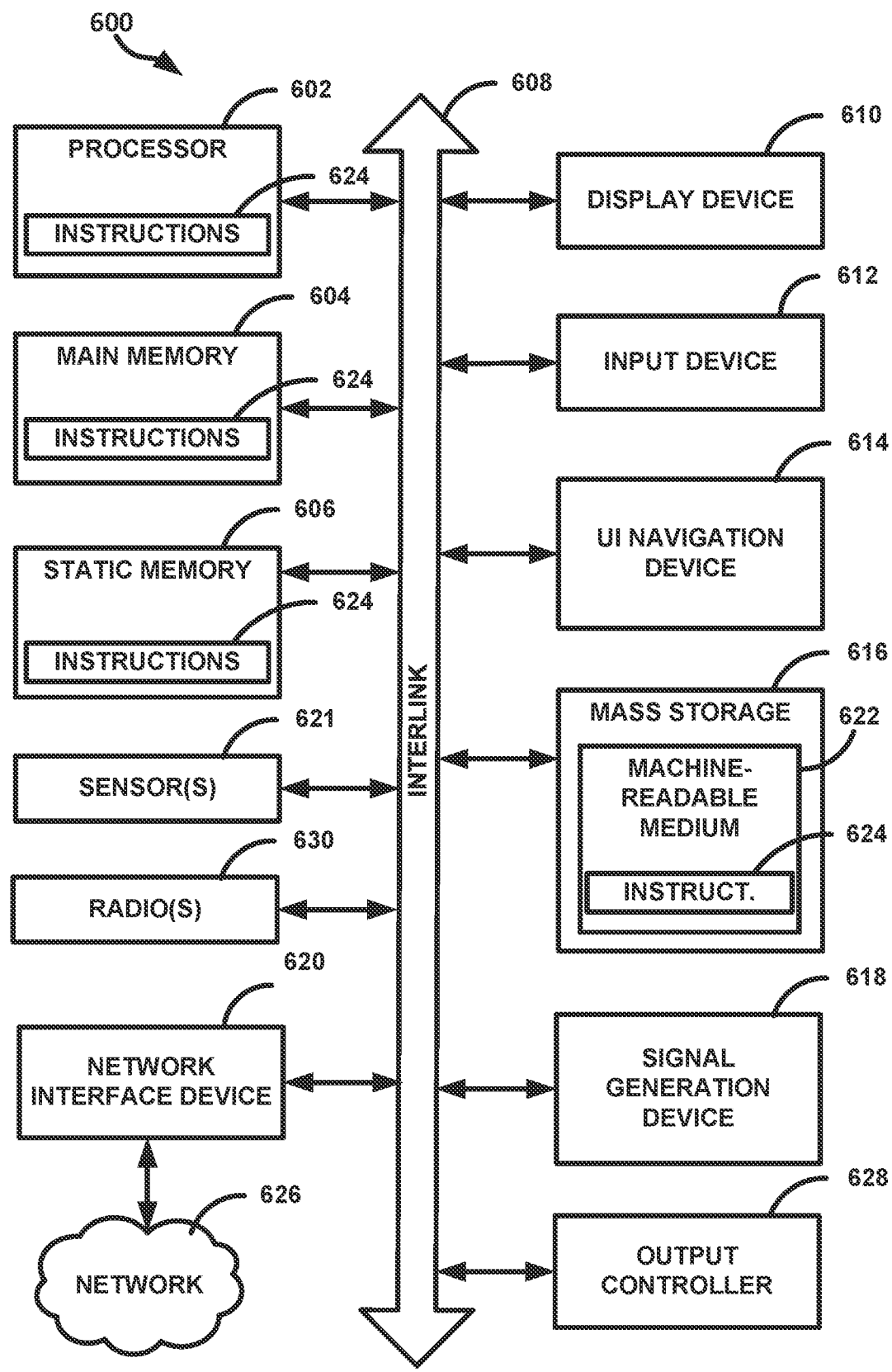
FIG. 6 illustrates, by way of example, a block diagram of an embodiment of a machine in the example form of a computer system within which instructions, for causing the machine to perform any one or more of the methodologies discussed herein, may be executed.

FIG. 6 illustrates, by way of example, a block diagram of an embodiment of a machine in the example form of a computer system within which instructions, for causing the machine to perform any one or more of the methodologies discussed herein, may be executed. The processing circuitry 332, ISR entity 440, or other component can include or be implemented using one or more components of the machine 600. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a mass storage unit 616, a signal generation device 618 (e.g., a speaker), a network interface device 620, and a radio 630 such as Bluetooth, WWAN, WLAN, and NFC, permitting the application of security controls on such protocols.

The computer system 600 as illustrated includes a sensor 621 that converts energy from one form into energy in another form. The sensor 621 is a transducer that can convert thermal energy, sound energy, optical energy, mechanical energy, or other energy into an electrical signal. The sensor 621 in general can provide data indicative of a characteristic of the environment in which the sensor 621 is situated.

The mass storage unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 can include a computer-implemented method for intelligent preparation of a battlefield (IPB), the method comprising storing, by a memory device, information used to generate IPB products, receiving, by a server coupled to the memory device, a request for an IPB product of the IPB products, receiving, by the server and from the memory device, information that satisfies conditions of a query, generating the requested IPB product based on the received information, and providing the requested IPB product to a client device.

In Example 2, Example 1 can further include, wherein the information is stored in a structured or semi-structured format.

In Example 3, at least one of Examples 1-2 can further include, wherein each item of the information is associated with an IPB product identification (ID), a timestamp indicating when the IPB product was generated, and a personnel ID indicating an entity that generated a report that includes the information.

In Example 4, at least one of Examples 1-3 can further include, wherein the request specifies an IPB product identification (ID) or a battlespace extent and the query includes the IPB ID or battlespace extent.

In Example 5, at least one of Examples 1-4 can further include, wherein the information used to generate the IPB products includes information gathered and provided in performing each of a plurality of operations comprising defining a battlespace environment, describing battlespace effects, evaluating an adversary; and determining a course of action of the adversary.

In Example 6, at least one of Examples 1-5 can further include comparing the received information with information for another IPB product to identify differences between the IPB products.

In Example 7, at least one of Examples 3-6 can further include receiving a second report, from a second client device, regarding a battlespace associated with the generated IPB product, updating the received information in accord with the second report, and generating an updated IPB product and providing the updated IPB product to the client device.

Example 8 can include a (e.g., non-transitory) machine-readable medium including instructions that, when executed by a machine, cause the machine to perform operations for intelligent preparation of a battlefield (IPB), the operations comprising storing information used to generate IPB products, receiving a request for an IPB product of the IPB products, receiving information that satisfies conditions of a query generated to satisfy the request, generating the requested IPB product based on the received information, and providing the requested IPB product to a client device.

In Example 9, Example 8 can further include, wherein the information is stored in a structured or semi-structured format.

In Example 10, at least one of Examples 8-9 can further include, wherein each item of the information is associated with an IPB product identification (ID), a timestamp indicating when the IPB product was generated, and a personnel ID indicating an entity that generated a report that includes the information.

In Example 11, at least one of Examples 8-10 can further include, wherein the request specifies an IPB product identification (ID) or a battlespace extent and the query includes the IPB ID or battlespace extent.

In Example 12, at least one of Examples 8-11 can further include, wherein the information used to generate the IPB products includes information gathered and provided in performing each of a plurality of operations comprising defining a battlespace environment, describing battlespace effects, evaluating an adversary, and determining a course of action of the adversary.

In Example 13, at least one of Examples 8-12 can further include, wherein the operations further comprise comparing the received information with information for another IPB product to identify differences between the IPB products.

In Example 14, at least one of Examples 10-13 can further include, wherein the operations further comprise receiving a second report, from a second client device, regarding a battlespace associated with the generated IPB product, updating the received information in accord with the second report, and generating an updated IPB product and providing the updated IPB product to the client device.

Example 15 can include processing circuitry and a memory device including instructions stored thereon that, when executed by a machine, cause the machine to perform operations for intelligent preparation of a battlefield (IPB), the operations comprising storing information used to generate IPB products, receiving a request for an IPB product of the IPB products, receiving information that satisfies conditions of a query generated to satisfy the request, generating the requested IPB product based on the received information, and providing the requested IPB product to a client device.

In Example 16, Example 15 can further include, wherein the information is stored in a structured or semi-structured format.

In Example 17, at least one of Examples 15-16 can further include, wherein each item of the information is associated with an IPB product identification (ID), a timestamp indicating when the IPB product was generated, and a personnel ID indicating an entity that generated a report that includes the information.

In Example 18, at least one of Examples 15-17 can further include, wherein the request specifies an IPB product identification (ID) or a battlespace extent and the query includes the IPB ID or battlespace extent.

In Example 19, at least one of Examples 15-18 can further include, wherein the information used to generate the IPB products includes information gathered and provided in performing each of a plurality of operations comprising defining a battlespace environment, describing battlespace effects, evaluating an adversary, and determining a course of action of the adversary.

In Example 20, at least one of Examples 17-19 can further include, wherein the operations further comprise comparing the received information with information for another IPB product to identify differences between the IPB products, receiving a second report, from a second client device, regarding a battlespace associated with the generated IPB product, updating the received information in accord with the second report, and generating an updated IPB product and providing the updated IPB product to the client device.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the aspects of this disclosure disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method for intelligent preparation of a battlefield (IPB), the method comprising:
   storing, by a memory device, information used to generate IPB products resulting in stored information, the IPB products including one or more of threat situation templates, event templates and associated event matrices, or terrain effects matrices, and one or more of modified combined obstacle overlays, or civil considerations overlays and assessments, the information including historical snapshots of states of the IPB products during creation of the IPB products including multiple overlays, the overlays comprising respective different images that when overlaid on an image of the battlefield and displayed provide respective different visual depictions of different aspects of the battlefield;

receiving, by a server coupled to the memory device, a request for an IPB product of the IPB products; receiving, by the server and from the memory device, information of the stored information that satisfies conditions of a query consistent with the request including one or more of the historical snapshots of states of an IPB product of the IPB products; generating the requested IPB product based on the received information;

providing the requested IPB product to a client device; receiving, by the server and from an intelligence, surveillance, and reconnaissance (ISR) device, changes to a geographical region covered by one or more overlays of the overlays;

responsive to receiving the changes, storing, by the memory device, data indicating the changes to the one or more overlays of the overlays with the information used to generate the IPB product; and responsive to determining, by the server, the changes to the one or more overlays correspond to a live view of the IPB Product on the device, providing a view of the changes to the one or more overlays of the overlays with the information used to generate the IPB product resulting in an updated, live view of the IPB product including an indication of the changes corresponding to the live view.

2. The method of claim 1, wherein the stored information is stored in a structured or semi-structured format and the historical snapshots include entity data, spatial data layers, imagery data layers, data link graph layout and depth information, user entered meta-data, and IPB step dependencies.

3. The method of claim 1, wherein each item of the stored information is associated with an IPB product identification (ID), a timestamp indicating when the IPB product was generated, and a personnel ID indicating an entity that generated a report that includes the stored information.

4. The method of claim 1, wherein the request specifies an IPB product identification (ID) or a battlespace extent and the query includes the IPB ID or battlespace extent.

5. The method of claim 1, wherein the stored information used to generate the IPB products includes stored information gathered and provided in performing each of a plurality of operations comprising:

defining a battlespace environment;
    describing battlespace effects;
    evaluating an adversary; and
    determining a course of action of the adversary.

6. The method of claim 1, further comprising comparing the received information with information of the stored information for another IPB product to identify differences between the IPB products.

7. The method of claim 3, further comprising:

receiving a second report, from a second client device, regarding a battlespace associated with the generated IPB product;

updating the received information in accord with the second report; and generating an updated IPB product and providing the updated IPB product to the client device.

8. A non-transitory machine-readable medium including instructions that, when executed by a machine, cause the machine to perform operations for intelligent preparation of a battlefield (IPB), the operations comprising:

storing information used to generate IPB products resulting in stored information, the IPB products including one or more of threat situation templates, event templates and associated event matrices, or terrain effects matrices, and one or more of modified combined obstacle overlays, or civil considerations overlays and assessments, the information including historical snapshots of states of the IPB products during creation of the IPB products including multiple overlays, the overlays comprising respective different images that when overlaid on an image of the battlefield and displayed provide respective different visual depictions of different aspects of the battlefield; receiving a request for an IPB product of the IPB products;

receiving information of the stored information that satisfies conditions of a query generated to satisfy the request, the received information including one or more of the historical snapshots of states of an IPB product of the IPB products;

generating the requested IPB product based on the received information; providing the requested IPB product to a client device; receiving, by the server and from an intelligence, surveillance, and reconnaissance (ISR) device, changes to a geographical region covered by one or more overlays of the overlays;

responsive to receiving the changes, storing, by the memory device, data indicating the changes to the one or more overlays of the overlays with the information used to generate the IPB product; and responsive to determining, by the server, the changes to the one or more overlays correspond to a live view of the IPB Product on the device, providing a view of the changes to the one or more overlays of the overlays with the information used to generate the IPB product resulting in an updated, live view of the IPB product including an indication of the changes corresponding to the live view.

9. The non-transitory machine-readable medium of claim 8, wherein the stored information is stored in a structured or semi-structured format and the historical snapshots include entity data, spatial data layers, imagery data layers, data link graph layout and depth information, user entered meta-data, and IPB step dependencies.

10. The non-transitory machine-readable medium of claim 8, wherein each item of the stored information is associated with an IPB product identification (ID), a timestamp indicating when the IPB product was generated, and a personnel ID indicating an entity that generated a report that includes the stored information.

11. The non-transitory machine-readable medium of claim 8, wherein the request specifies an IPB product identification (ID) or a battlespace extent and the query includes the IPB ID or battlespace extent.

12. The non-transitory machine-readable medium of claim 8, wherein the stored information used to generate the IPB products includes stored information gathered and provided in performing each of a plurality of operations comprising:
- defining a battlespace environment;
- describing battlespace effects;
- evaluating an adversary; and
- determining a course of action of the adversary.

13. The non-transitory machine-readable medium of claim 8, wherein the operations further comprise comparing the received information with the stored information for another IPB product to identify differences between the IPB products.

14. The non-transitory machine-readable medium of claim 10, wherein the operations further comprise:
- receiving a second report, from a second client device, regarding a battlespace associated with the generated IPB product;
- updating the received information in accord with the second report; and
- generating an updated IPB product and providing the updated IPB product to the client device.

15. A system comprising:
processing circuitry;
a memory device including instructions stored thereon that, when executed by a machine, cause the machine to perform operations for intelligent preparation of a battlefield (IPB), the operations comprising:
storing information used to generate IPB products resulting in stored information, the IPB products including one or more of threat situation templates, event templates and associated event matrices, or terrain effects matrices, and one or more of modified combined obstacle overlays, or civil considerations overlays and assessments, the information including historical snapshots of states of the IPB products during creation of the IPB products including multiple overlays, the overlays comprising respective different images that when overlaid on an image of the battlefield and displayed provide respective different visual depictions of different aspects of the battlefield;
receiving a request for an IPB product of the IPB products; receiving information of the stored information that satisfies conditions of a query generated to satisfy the request and including one or more of the historical snapshots of states of an IPB product of the IPB products; generating the requested IPB product based on the received information; providing the requested IPB product to a client device;
receiving, by the server and from an intelligence, surveillance, and reconnaissance (ISR) device, changes to a geographical region covered by one or more overlays of the overlays; responsive to receiving the changes, storing, by the memory device, data indicating the changes to the one or more overlays of the overlays with the information used to generate the IPB product; and
responsive to determining, by the server, the changes to the one or more overlays corresponds to a live view of the IPB Product on the device, providing a view of the changes to the one or more overlays of the overlays with the information used to generate the IPB product resulting in an updated, live view of the IPB product including an indication of the changes corresponding to the live view.

16. The system of claim 15, wherein the stored information is stored in a structured or semi-structured format and the historical snapshots include entity data, spatial data layers, imagery data layers, data link graph layout and depth information, user entered meta-data, and IPB step dependencies.

17. The system of claim 15, wherein each item of the stored information is associated with an IPB product identification (ID), a timestamp indicating when the IPB product was generated, and a personnel ID indicating an entity that generated a report that includes the information.

18. The system of claim 15, wherein the request specifies an IPB product identification (ID) or a battlespace extent and the query includes the IPB ID or battlespace extent.

19. The system of claim 15, wherein the stored information used to generate the IPB products includes information of the stored information gathered and provided in performing each of a plurality of operations comprising:
- defining a battlespace environment;
- describing battlespace effects;
- evaluating an adversary; and
- determining a course of action of the adversary.

20. The non-transitory machine-readable medium of claim 17, wherein the operations further comprise:
- comparing the received information with information of the stored information for another IPB product to identify differences between the IPB products;
- receiving a second report, from a second client device, regarding a battlespace associated with the generated IPB product;
- updating the received information in accord with the second report; and
- generating an updated IPB product and providing the updated IPB product to the client device.

* * * * *